Figure 1:
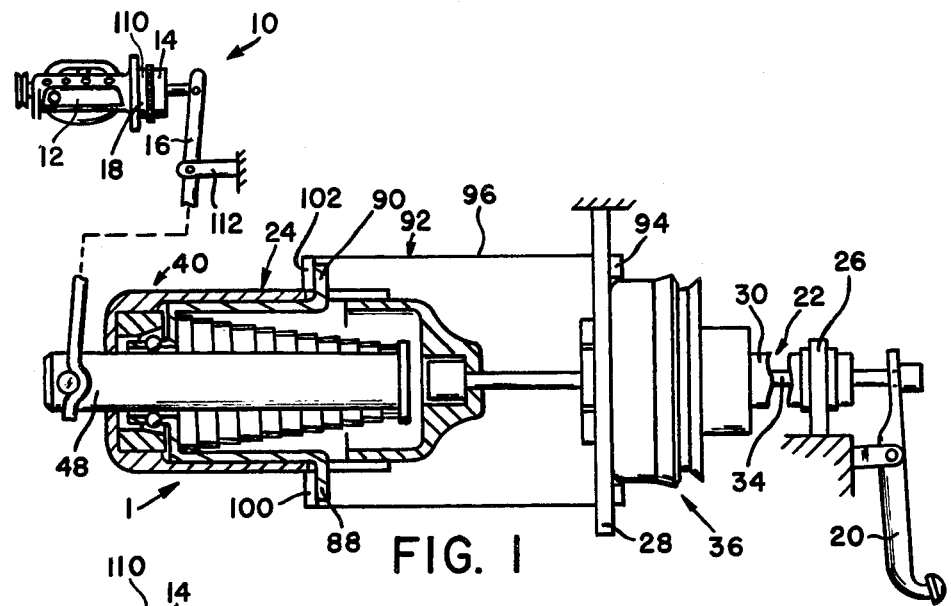

United States Patent [19]

Taig

[11] Patent Number: 4,463,843

[45] Date of Patent: Aug. 7, 1984

[54] CABLE ASSEMBLY
[75] Inventor: Alistair G. Taig, South Bend, Ind.
[73] Assignee: The Bendix Corporation, Southfield, Mich.
[21] Appl. No.: 250,497
[22] Filed: Apr. 2, 1981
[51] Int. Cl.³ .............................................. F16D 13/75
[52] U.S. Cl. ............................ 192/111 A; 74/501.5 R; 188/71.8; 188/196 R
[58] Field of Search .................... 128/71.8, 196 R; 192/111 A, 70.25, 111 R; 74/501.5 R
[56] References Cited
U.S. PATENT DOCUMENTS 2,421,869  6/1947  Brock ........................ 192/111 A
4,068,750  1/1978  Gatewood ................. 192/111 A
4,378,713  4/1983  Haskell et al. ............. 188/196 R Primary Examiner—Kenneth Dorner
Assistant Examiner—Anthony W. Raskob, Jr.
Attorney, Agent, or Firm—Paul D. Schoenle; Ken C. Decker

[57] ABSTRACT

A cable assembly connects an input member (20) with a clutch assembly 10. The cable assembly comprises a sheath (30) enclosing a cable (34). An automatic adjuster 24 connects the cable (34) with a clutch lever (16) and the automatic adjuster is actuated by a bracket (92) to provide for extension between the cable (34) and the lever (16) in order to accommodate wear for the clutch assembly.

3 Claims, 3 Drawing Figures

CABLE ASSEMBLY

This invention relates to a cable assembly for connecting an input member, such as a pedal, with a clutch assembly. In automotive type vehicles with manual transmissions, a clutch pedal is depressed in order to disengage a clutch assembly for the purpose of shifting gears.

A clutch assembly includes a friction plate and a disc which is biased by resilient means to maintain the friction plate in engagement with a flywheel of a vehicle engine. In order to disengage the clutch assembly, the friction plate is separated from the flywheel. With repeated useage the friction clutch is worn so that its width is decreased. When the clutch assembly is in a normal condition engaging the flywheel, a clutch lever cooperating with the friction plate is also disposed in a normal condition. The cable assembly is connected to the clutch lever and the pedal. Consequently, when the friction plate wears to define a new position for the normal position, the lever and cable assembly must compensate for this variance or else undesireable tolerances are introduced into the clutch assembly. In order to take up friction plate wear or adjustment device is provided to adjust for changes in the engaged position of the clutch lever. In general, this adjustment device is connected with the clutch pedal.

Figure 2:
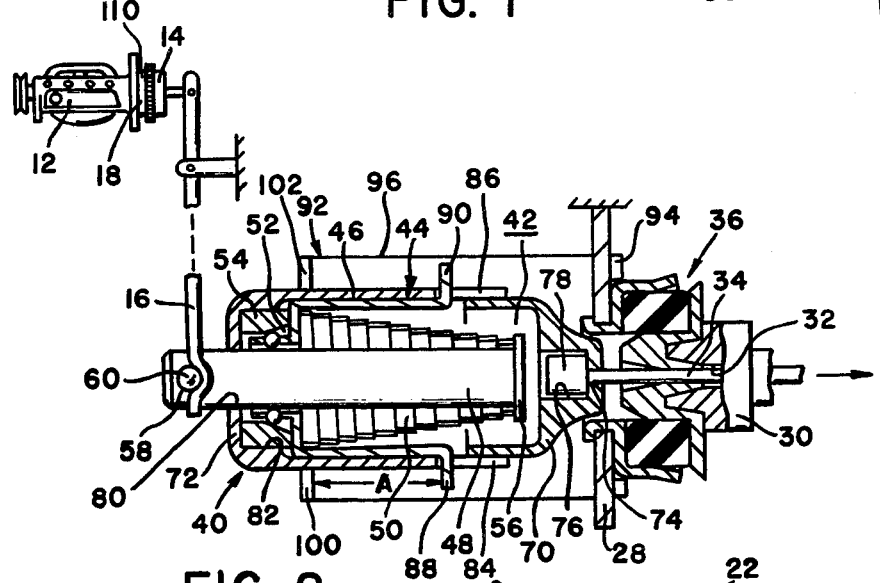
Figure 3:
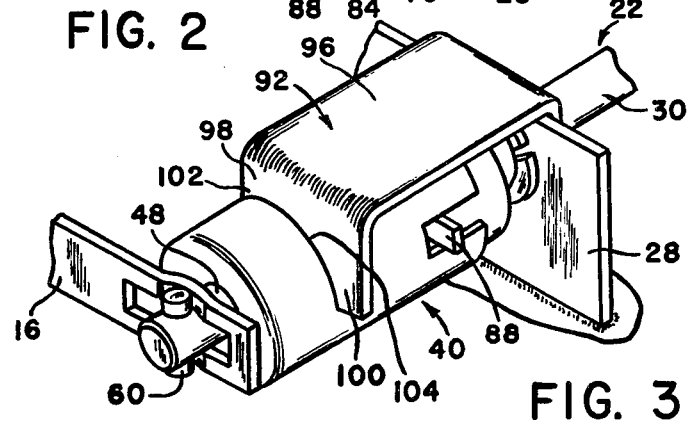

With front wheel drive vehicles, the cable assembly is relatively short as the engine and clutch assembly are compactly disposed close to the fire wall which sup- FIG. 1 is a schematic illustration of a vehicle clutch assembly and the actuation linkage to control the clutch assembly;

FIG. 2 is a cross sectional view of the automatic adjuster included in the actuation linkage of FIG. 1; and FIG. 3 is a perspective view of the automatic adjuster shown in FIGS. 1 and 2.

A clutch assembly 10 in a vehicle normally occupies an engaged position to transmit torque from an engine 12 to a transmission 14. The clutch assembly includes a lever 16 coupled via throw out bearings and a pressure plate (not shown) with a friction plate 18. The friction plate defines an initial thickness when the clutch assembly is new and after repeated operation of the clutch assembly the friction plate is worn to a reduced thickness. In general, the friction plate is disposed between the pressure plate and a flywheel.

In order to operate the clutch assembly, an input member or clutch pedal 20 is pivotally secured to a frame of the vehicle and a cable assembly 22 cooperates with an automatic adjuster 24 to connect the input member 20 with the clutch assembly lever 16. A first support fixture 26 adjacent the input member 20 fixedly secures the cable assembly 22 and a second support fixture 28 at the other end of the cable assembly 22 also fixedly secures the cable assembly 22. The cable assembly 22 comprises an outer sheath or conduit 30 with a longitudinal bore 32 for movably receiving a cable 34. The cable 34 is connected with the input member 20. The second support fixture 28 carries a fitting 36 which fastens the sheath 30 thereto. Consequently, the sheath cated flanges 100 and 102. The flanges 100 and 102 are engageable with the tabs 88 and 90, respectively, in a manner to be described herein after and the leg 98 is provided with an arcuate recess 104 substantially matching the outer circumference of the housing 40, so that the surface of the recess 104 slidably engages the housing 40.

In the engaged position, the clutch assembly lever 16 occupies a rest position illustrated in FIG. 1 with a clutch spring (not shown) located within a clutch housing 110 biasing the lever to its rest position. When the input member 20 is actuated the lever 16 pivots counter clockwise about pivot 112 against the force of the clutch spring in housing 110 to move the friction plate 18 out of frictional engagement with the flywheel and the pressure plate. Conversely, when the pedal is deactuated, the clutch spring in the housing 110 biases the lever 16 to pivot clockwise about pivot 112 to frictionally engage the friction plate 18 between the flywheel and the pressure plate. Initially, the travel for the end of the lever adjacent the friction plate is set so that the engagement of the clutch assembly is related to the position of the input member 20. However, with friction plate wear this relation is altered and in the absence of the automatic adjuster the input member 20 must be almost completely returned to its normal position before the friction plate is in engagement with the pressure plate and flywheel. The present invention overcomes this problem in the following manner.

In FIG. 1, the clutch assembly lever 16 is disposed in position where the unworn friction element is fully engaged with the flywheel and pressure plate. In this position the flanges 100 and 102 are contacting the tabs 88 and 90, and a force is transmitted from the flanges to the tabs via spring 50. With collar 46 in engagement with the flanges 100 and 102, the spring 50 maintains a force on the lever 16 via rod 48 to bias the lever 16 counterclockwise about pivot 112. The force of the spring 50 on the lever 16 causes a small load to be applied to a throw out bearing located within the clutch housing 110. Also, with the collar 46 engaging the flanges 100 and 102, the friction balls 52 are slightly engaging the cam sleeve 54 and the rod 48 so that the rod 48 is substantially free to slide relative to the friction balls 52 in either direction, albeit under the influence of spring 50. Upon actuation of the input member 20, the cable 34 moves relative to the sheath 30 and fixture 28. The enlarged head 78 pulls the housing 40 toward the fixture 28 to the position illustrated in FIG. 2. When the tabs 88 and 90 are separated from the flanges 100 and 102, the spring 50 fully engages the friction balls 52 with the rod 48 and the cam sleeve 54. As a result, continued movement of the housing 40 toward the right moves the rod 48 toward the right to pivot lever 16 counterclockwise about pivot 112. When the pedal 20 is fully actuated, the tabs 88 and 90 are spaced from the flanges 100 and 102 a distance A, which defines the preferred travel for the clutch assembly. Upon deactuation of the input member 20, the clutch spring within housing 110 biases the lever 16 to pivot clockwise, thereby moving the housing 40, via rod 48 and locking device 44, away from fixture 28. If the friction plate retains its unworn dimension, the housing 40 will return to the position of FIG. 1 wherein the tabs 88 and 90 will lightly contact the flanges 100 and 102, respectively. However, if the friction plate is worn, the lever 16 will continue to pivot beyond the position shown in FIG. 1. As a result the flanges 100 and 102 which are secured to bracket 92 and fixture 28 will abut and oppose the movement of the tabs 88 and 90 with the housing 40 and locking device 44. This opposition causes the collar 46 to contract spring 50 and move slightly relative to the housing 40 to loosen the friction balls 50 from the cam sleeve 54, thereby unlocking the rod 48 from the housing 40. The lever 16 continues to pivot clockwise to take up the increased clearance between the friction plate, the flywheel and the pressure plate. The rod 48 is moved to the left relative to the collar 46 and the housing 40 under the influence of the clutch spring and against the spring 50 until the clutch is fully engaged to define an adjusted position for the rod 48 relative to the housing. A subsequent actuation for the input member 20 pulls the housing 40 toward the fixture 28. The housing 40 moves slightly relative to the collar 46, the rod 48 and the bracket 92, until the tabs 88 and 90 separate from the flanges 100 and 102, whereupon the spring 50 reestablishes a locking engagement between the rod 48 and housing 40 via collar 46 and balls 52. Thereafter, the housing continues to move to impart movement to the rod 48 via the locking engagement to pivot lever 16. If the increased clearance created by the worn friction plate is completely adjusted by the new position of the locking device on the rod 48, then deactuation of the input member 20 will cause the housing and tabs to move to a position in which the tabs are lightly contacting the flanges of the bracket. Further wear of the friction plate results in further compensation by adjustment of the position of the rod 48 relative to the housing 40.

There are many variations which are feasible by one skilled in the art and, as such, these variations are intended to be covered by the scope of the appended claims.

I claim:

1. An automatic adjuster for a cable assembly extending from a pedal to a lever, the pedal being pivotally actuated to control movement of the lever, the lever cooperating with a clutch member which is wearable to define a slight variation for the rest position of the lever in response to wear of the clutch member, the cable assembly including a sheath extending between a pair of supports and substantially enclosing the cable therein, the cable assembly further including a housing coupled to the cable remote from the pedal and adjacent the lever and a rod cooperating with the housing to connect the cable with the lever via the housing, the rod directly engaging the lever to move therewith, a bracket fixedly disposed relative to one of the pair of supports adjacent the lever, a friction assembly movably disposed within the housing and cooperating with a resilient member to releasably lock the rod with the housing, the housing, the friction assembly, the rod and the lever being movable relative to the bracket when the pedal is actuated to move the cable within the sheath, the lever returning to a slightly altered rest position when the pedal is deactuated, the bracket being engageable with the friction assembly as the lever approaches its rest position in order to overcome the resilient member and automatically release the locking engagement between the rod and the housing, the lever moving the rod relative to the friction assembly and housing as the lever returns to the slightly altered rest position, the friction assembly cooperating with the resilient member to reestablish a locking engagement with the rod and housing when the lever reaches its new rest position, bracket comprising a U-shaped member with a first leg connected to the one of the pair of supports, a longitudinal body extending from the first leg in the direction of the lever to a second leg, and the housing being movable from a rest position wherein the friction assembly engages the second leg to a position substantially between the first and second legs to separate the friction assembly from the second leg.

2. The automatic adjuster of claim 1 in which the housing comprises a pair of elements fixedly joined together to form the housing, one of the pair of elements defining a pocket leading to an opening receiving the cable and the pocket traps an end of the cable so that the housing and cable move in unison together at all times even when the rest position is varied.

3. The automatic adjuster of claim 2 in which the housing includes an opening receiving the rod and at least one slot remote from the opening, and a portion of the friction assembly extends outwardly of the housing via the one slot to oppose the bracket.

* * * * *